US007268522B1

(12) United States Patent
Baker

(10) Patent No.: US 7,268,522 B1
(45) Date of Patent: Sep. 11, 2007

(54) EXCITATION CONTROL FOR WOUND FIELD SYNCHRONOUS DYNAMOELECTRIC MACHINES

(75) Inventor: Donal E. Baker, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 11/438,612

(22) Filed: May 20, 2006

(51) Int. Cl.
*H20P 9/10* (2006.01)
(52) U.S. Cl. .......................... 322/59; 322/75; 322/89; 322/95; 322/44; 322/68; 290/31; 290/4 R; 290/52; 290/46
(58) Field of Classification Search .................. 322/59, 322/75, 89, 95, 44, 17, 68; 290/31, 4 R, 290/52; 289/46
See application file for complete search history.

(56) References Cited

U.S. PATENT DOCUMENTS 6,909,263 B2 * 6/2005 Xu et al. ....................... 322/29
6,979,979 B2 12/2005 Xu et al. ....................... 322/59
7,078,826 B2 * 7/2006 Xu et al. ....................... 290/52
7,154,249 B2 * 12/2006 Velhner et al. ............... 322/59

* cited by examiner

*Primary Examiner*—Darren Schuberg
*Assistant Examiner*—Iraj Mohandesi
(74) *Attorney, Agent, or Firm*—Stephen G. Mican

(57) ABSTRACT

A wound field synchronous (WFS) dynamoelectric machine comprises: a rotor assembly; an exciter generator section comprising a stationary multiphase exciter stator winding for receiving excitation power from a multiphase alternating current (AC) source to generate an exciter stator magnetic field, a multiphase exciter rotor winding in the rotor assembly for generating multiphase AC excitation power as it cuts through the exciter stator magnetic field and a rotating rectifier assembly in the rotor assembly for converting the multiphase AC excitation power to direct current (DC) excitation power; a synchronous machine section comprising a DC main rotor winding in the rotor assembly for generating a main rotor magnetic field and a stationary multiphase main stator winding for receiving a multiphase AC control signal to generate a rotating main stator magnetic field that interacts with the main rotor magnetic field to rotate the rotor assembly; and an impedance that selectively connects one phase of the exciter stator winding to another phase of the exciter stator winding that disconnects from the multiphase AC current source above a predetermined rotational speed of the rotor assembly.

18 Claims, 3 Drawing Sheets

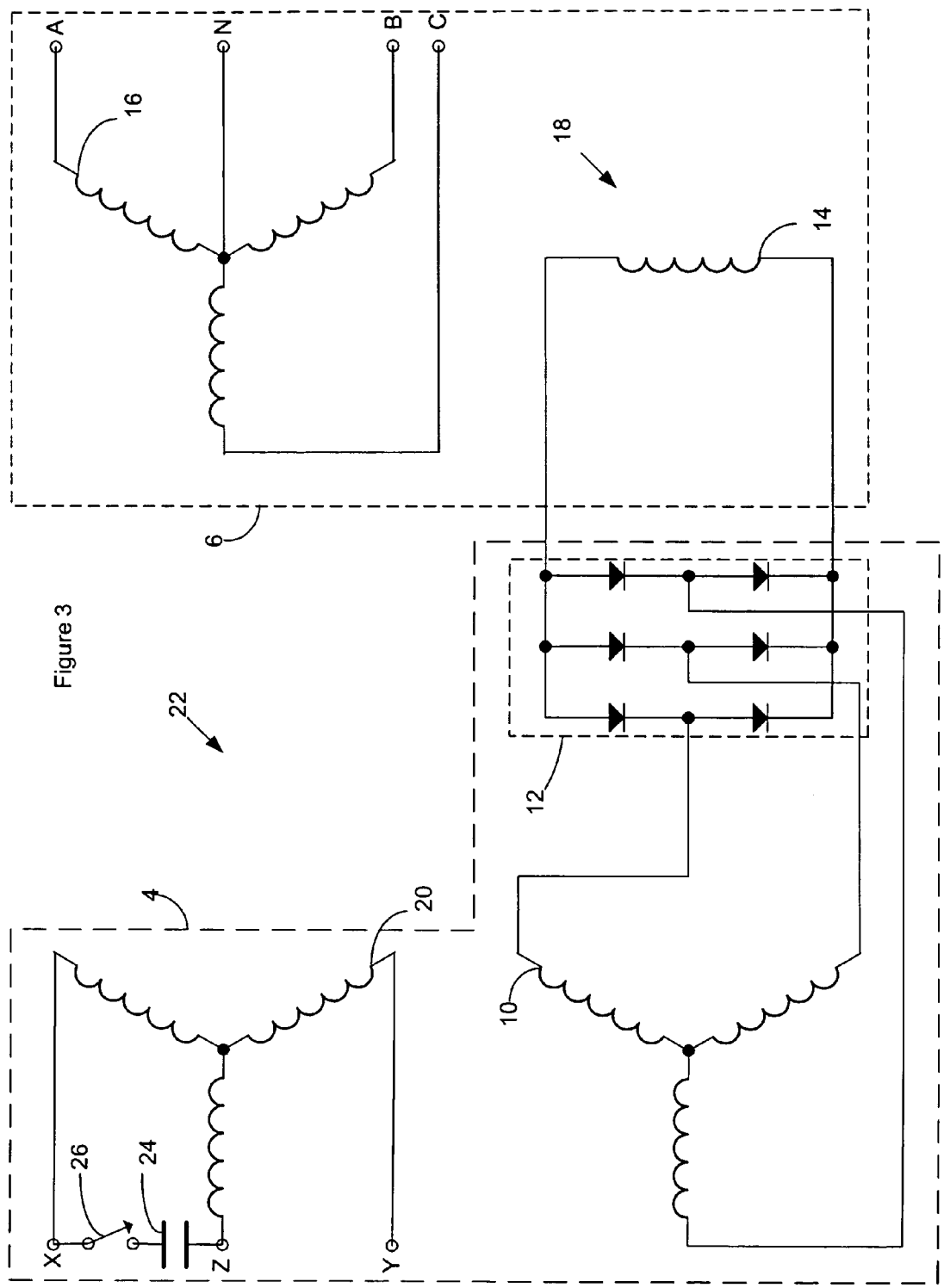

EXCITATION CONTROL FOR WOUND FIELD SYNCHRONOUS DYNAMOELECTRIC MACHINES

FIELD OF THE INVENTION

The invention relates to a wound field synchronous (WFS) dynamoelectric machine used as a source of motive power, and more particularly to controlling the excitation of such a WFS dynamoelectric machine over a wide range of rotational speeds to achieve desired levels of torque within the rotational speed range.

BACKGROUND OF THE INVENTION

Vehicles such as aircraft may use a WFS dynamoelectric machine as a generator powered by a prime mover, typically a gas turbine engine. Typically, a separate air turbine starter for large engines or a separate dynamoelectric machine for small turbines, usually a direct current (DC) dynamoelectric machine, serves as a starter motor. It is more desirable to use the WFS dynamoelectric machine as both a generator and a starter motor to eliminate the weight, bulk and mechanical complexity of a separate air turbine or electric starter motor and associated clutch for disengaging the starter motor after a start operation. A single WFS dynamoelectric machine may provide savings in weight, space and mechanical complexity compared to separate machines for starter motor and generator functions in combination with a mechanical clutch mechanism for disengaging the starter motor after the start operation.

However, there are several problems with employing a single WFS dynamoelectric machine for both starting and power generating functions. FIG. 1 shows a typical schematic for a WFS dynamoelectric machine 2 designed for generating alternating current (AC) according to the prior art. The WFS dynamoelectric machine 2 comprises two basic dynamoelectric machine sections, an exciter generator section 4 and a main synchronous machine section 6. The exciter generator section 4 comprises an exciter stator winding 8, an exciter rotor winding 10 and a rotating rectifier assembly 12. The main synchronous machine section 6 comprises a main rotor winding 14 and a main stator winding 16. The exciter rotor winding 10, the rotating rectifier assembly 12 and the main rotor winding 14 together comprise a rotor assembly 18 for the WFS dynamoelectric machine 2. The exciter stator winding 8 receives DC from a DC power source (not shown) on terminals V+ and V− to establish a stationary exciter magnetic field. A prime mover (not shown), such as an aeronautical gas turbine engine, rotates the rotor assembly 18 to cause the exciter rotor winding 10 to cut through the stationary exciter magnetic field flux established by the exciter stator winding 8. Since the exciter rotor winding 10 comprises a multiphase winding, typically three phase as shown in FIG. 1, it thereby generates multiphase AC excitation power. The rotating rectifier assembly 12 receives this multiphase AC excitation power and rectifies it to provide DC excitation power. The main rotor winding 14 receives this DC excitation power from the rotating rectifier assembly 12 to generate a rotating main magnetic field. The rotating magnetic field flux cuts through the main stator winding 16, causing it to generate main generator output power on terminals A, B and C. Since the main stator winding 16 comprises a multiphase winding, typically three phase as shown in FIG. 1, the main generator output power is multiphase AC. In most aeronautical vehicular systems, the multiphase AC generator output is approximately 400 Hz three phase power.

Of course, the exciter rotor winding 10 cannot generate multiphase AC excitation power when the rotor assembly 18 is at standstill with DC power applied to the exciter stator winding 8, since it cannot cut the stationary exciter magnetic field flux. This is a problem when adapting the WFS dynamoelectric machine 2 for use as a starter motor. However, if the exciter stator winding 8 receives AC from an AC power source, the exciter stator winding 8 may produce an alternating exciter magnetic field flux that cuts the exciter rotor winding 10 even when it is stationary so that it produces AC excitation power even when the rotor assembly is at standstill. The rotating rectifier assembly 12 may then receive the AC excitation power generated by the exciter rotor winding 10 and convert it to DC excitation power. The main rotor winding 14 receives the DC excitation power from the rotating rectifier 12 to generate a main rotor magnetic field. The main stator winding 16 may then receive a multiphase AC control signal from a power source (not shown), such as a motor controller, on terminals A, B and C that generates a rotating main stator magnetic field that interacts with the main rotor magnetic field to rotate the rotor assembly 18, thereby allowing the WFS dynamoelectric machine 2 to serve as a starter motor.

The most effective method of generating the alternating exciter stator magnetic field is with multiphase AC. In this case, the exciter generator section 4 ideally comprises a multiphase AC exciter stator winding 20 as shown in FIG. 2. The multiphase AC exciter stator winding 20 is typically three phase as shown. This multiphase exciter stator winding 20 may be added adjacent the existing exciter stator winding 8, or replace it altogether as shown in FIG. 2. For starter motor operation, the multiphase exciter stator winding 20 receives multiphase AC from an AC exciter power source (not shown) on terminals X, Y and Z. Ideally, the AC exciter power source comprises an adjustable multiphase AC exciter power source that has variable exciter power output with a range of frequencies and electrical potentials that are satisfactory for both starting and generating modes of operation. However, such an adjustable multiphase AC exciter power source involves increased complexity, bulk, weight and cost to the vehicle. Therefore, it is generally more practical to couple the multiphase exciter stator winding to an existing AC power distribution system for the vehicle, typically 400 Hz three phase AC. When replacing the exciter stator winding 8, this multiphase AC winding 20 may serve as a DC winding for generator operation by connecting a DC supply to two of the three phases on two of the terminals X, Y and Z.

In any case, the AC exciter power source should have a phase rotation that is opposed to the rotation of the rotor assembly 18 for the starting mode so that the rotational speed of the rotor assembly 18 increases the rate at which the exciter rotor winding 10 cuts a magnetic field flux generated by the multiphase exciter stator winding 20 and therefore the current generated in the exciter rotor winding 10 shall also increase. This causes the current in the main rotor winding 14 to increase, resulting in saturation of a magnetic field generated by the main rotor winding 14 and causing the WFS dynamic machine 2 to behave like a salient pole permanent magnet motor for the entire starting operation.

A problem with using an existing AC power distribution system as an AC exciter power source for the starting mode is that the back electromotive force (EMF) generated in the main stator winding 16 may increase to such a level as the rotor assembly 18 increases in rotational speed that the motor controller that drives the main stator winding 16 cannot develop enough electrical potential to overcome it, thereby resulting in reduced torque that may prevent a successful starting operation. Of course, reducing the output of the exciter generator section 4 at the higher rotational speeds is possible by using the adjustable multiphase AC exciter power source hereinbefore described, but this would add complexity, bulk, weight and cost.

Reducing the power to the exciter stator winding 20 at high rotational speeds above a predetermined rotational speed is also possible whilst using the existing AC power distribution system to power the multiphase exciter stator winding 20 by disconnecting one of the phases of the exciter stator winding 20 at rotational speeds above the predetermined rotational speed. The two connected phases of the exciter stator winding 20 effectively result in single phase excitation that reduces the current that the exciter rotor winding 10 generates with a corresponding reduction in current to the main rotor winding 14, resulting in less back EMF at the high rotational speeds.

It is not difficult to design a WFS dynamic machine 2 with a multiphase exciter stator winding 20 that may provide sufficient current for the main rotor winding 14 to develop adequate torque for low rotational speeds during the starting operation and provide suitable operation over the entire generating operation rotational speed and load range without the need for a separate exciter power source, it is difficult and sometimes impossible to provide optimum reduction in excitation with single phase excitation at high rotational speeds to reduce back EMF with a single exciter stator winding 20.

SUMMARY OF THE INVENTION

The invention comprises a WFS dynamoelectric machine that comprises a suitable impedance connected between one phase of a multiphase exciter stator winding that disconnects from a multiphase alternating current (AC) source above a predetermined rotational speed and another one of the phases of the multiphase exciter stator winding remaining connected to the multiphase AC source during a starting operation to induce a phase-shifted current in the disconnected phase of the multiphase exciter stator winding that provides a desired amount of excitation current in an associated exciter rotor winding at high rotational speeds above the predetermined rotational speed.

The invention generally comprises a wound field synchronous (WFS) dynamoelectric machine that comprises: a rotor assembly; an exciter generator section comprising a stationary multiphase exciter stator winding for receiving excitation power from a multiphase alternating current (AC) source to generate an exciter stator magnetic field, a multiphase exciter rotor winding in the rotor assembly for generating multiphase AC excitation power as it cuts through the exciter stator magnetic field and a rotating rectifier assembly in the rotor assembly for converting the multiphase AC excitation power to direct current (DC) excitation power; a synchronous machine section comprising a DC main rotor winding in the rotor assembly for generating a main rotor magnetic field and a stationary multiphase main stator winding for receiving a multiphase AC control signal to generate a rotating main stator magnetic field that interacts with the main rotor magnetic field to rotate the rotor assembly; and an impedance that selectively connects one phase of the exciter stator winding to another phase of the exciter stator winding that disconnects from the multiphase AC current source above a predetermined rotational speed of the rotor assembly.

DESCRIPTION OF THE DRAWINGS

FIG. 3 is a schematic diagram of a WFS dynamoelectric machine suitable for starting and generating modes of operation according to a possible embodiment of the invention.

DETAILED DESCRIPTION OF THE INVENTION

Figure 1:
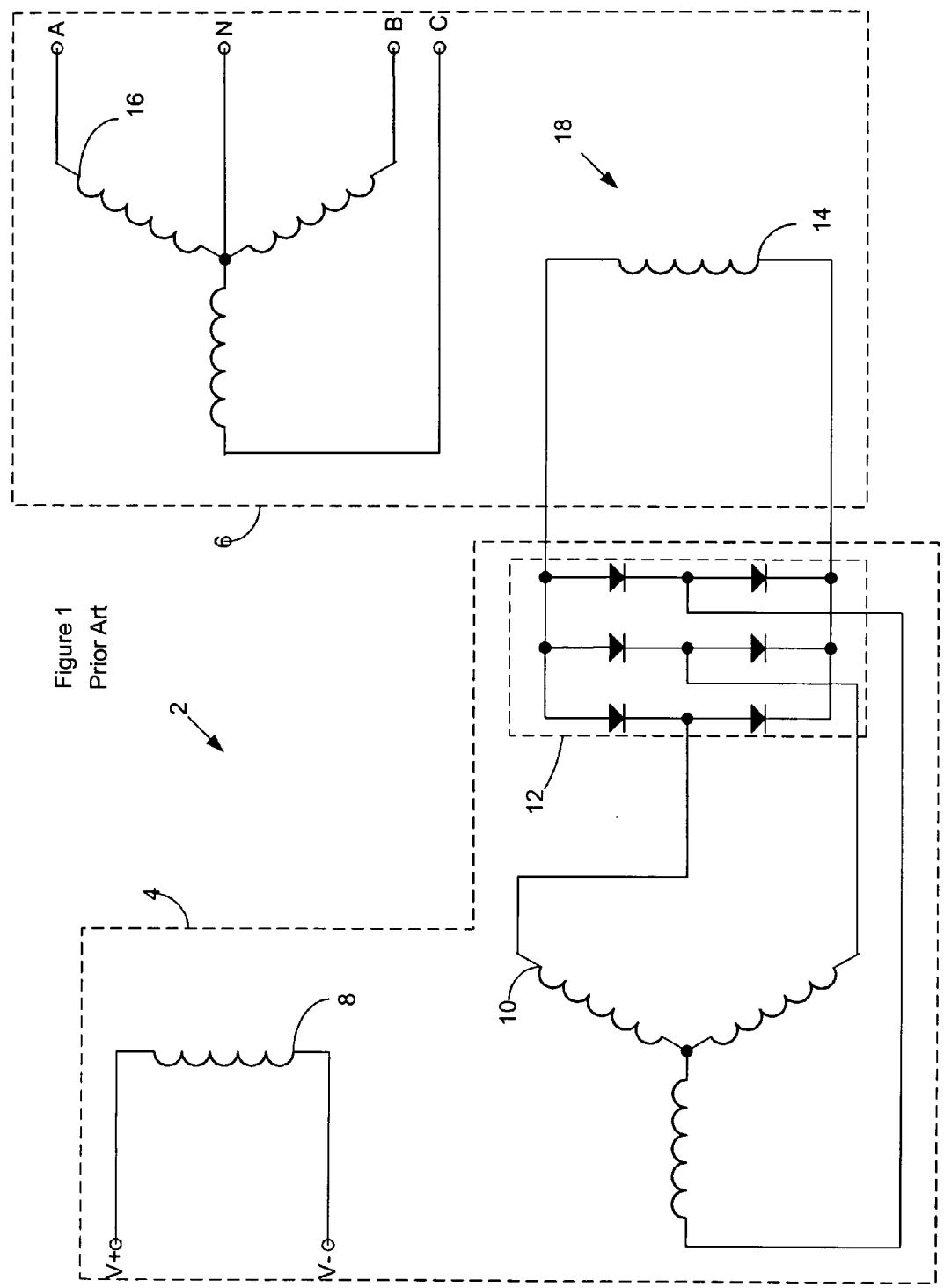
FIG. 1 is a schematic diagram of a WFS dynamoelectric machine with a DC exciter stator winding suitable for a generating mode of operation according to the prior art.
Figure 2:
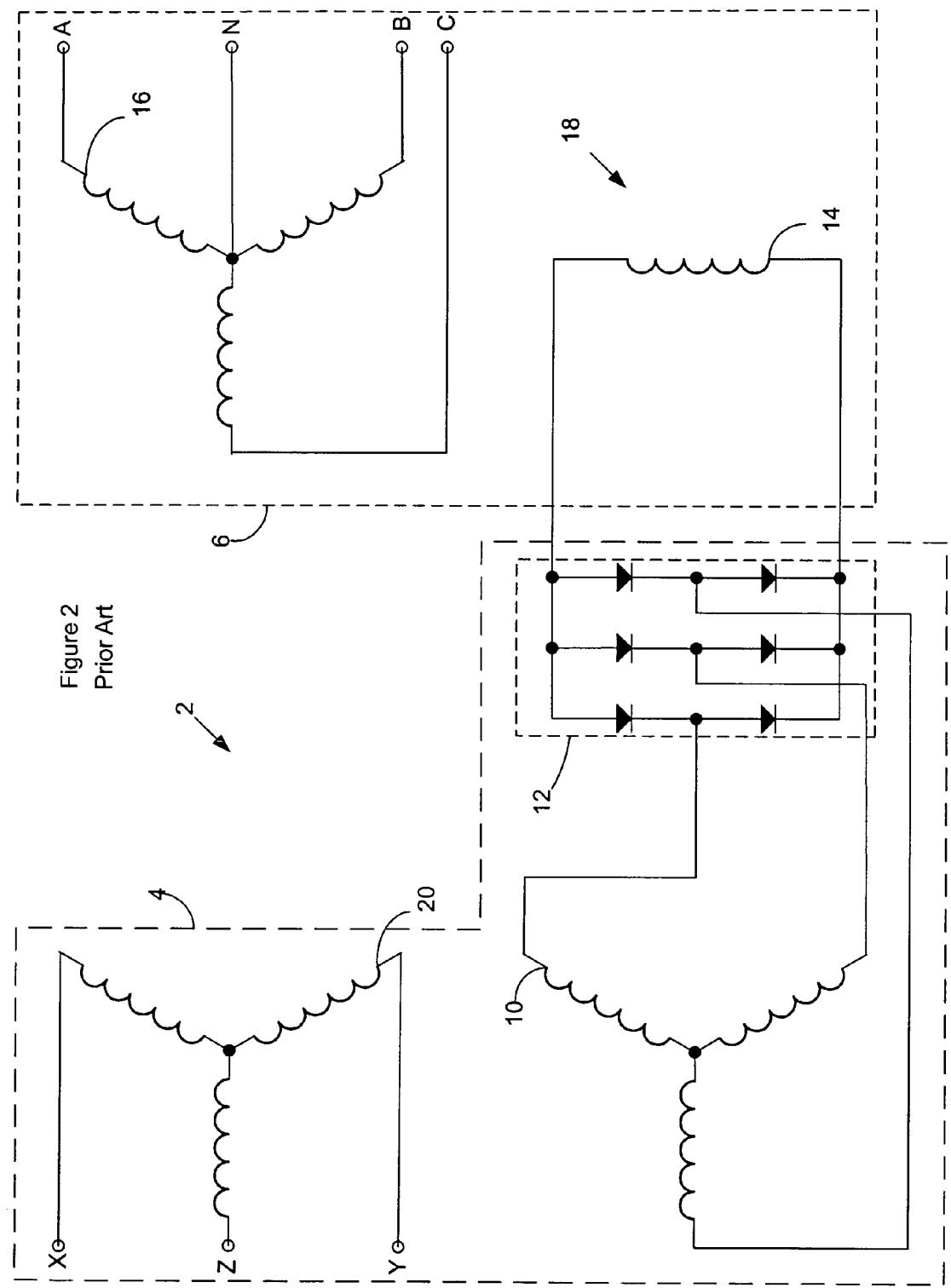
FIG. 2 is a schematic diagram of a WFS dynamoelectric machine with a multiphase exciter stator winding suitable for starting and generating modes of operation according to the prior art.

FIG. 3 is a schematic diagram of a WFS dynamoelectric machine 22 suitable for starting and generating modes of operation according to a possible embodiment of the invention. It is similar to the WFS dynamoelectric machine 2 shown in FIG. 2, except that the exciter generator section 4 additionally comprises an impedance 24 that may selectively couple one phase of the multiphase exciter stator winding 20 to another phase of the multiphase exciter stator winding 20. In FIG. 3, impedance 24 couples to one phase of the multiphase exciter stator winding 20 through terminal Z and selectively to another phase of the multiphase exciter stator winding 20, as represented by a switching element 26 to another phase of the multiphase exciter stator winding 20 through terminal X. Alternatively, the impedance 24 may couple from terminal X to Y or Y to Z. The switching element 26 may be a single pole, single throw (SPST) switch as shown in FIG. 3, or any similar switching element, such as a solid state or solenoid operated relay. The impedance 24 may comprise a purely negative reactance component, such as a capacitor as shown in FIG. 3, or a complex impedance comprising a resistive component in combination with a purely negative reactance component, such as a resistor in series with a capacitor. Alternatively, the WFS dynamoelectric machine 22 may have a modified configuration wherein the impedance 24 may comprise a positive reactance component, such as an inductor or a complex impedance comprising a resistive component in combination with a purely positive reactance component, such as a resistor in series with an inductor.

In operation as configured in FIG. 3, terminals X, Y and Z of the multiphase exciter stator winding 20 for the WFS dynamoelectric machine 22 connect to an existing source of multiphase AC power (not shown) during the starting operation from standstill up to a predetermined rotational speed of the rotor assembly 18. During this time, the switching element 26 remains open as shown so that the impedance 24 does not couple between terminals X and Z. Above the predetermined rotational speed, one of the phases, namely the phase with terminal Z, disconnects from the existing source of multiphase AC power and the switching element 26 couples the impedance 24 between terminals X and Z.

Accordingly, the phase of the multiphase exciter stator winding 20 connected to terminal Z receives a phase-shifted current relative to the current through the phase connected to terminal X. Adjusting the value of the impedance 24 adjust the degree of phase shift and allows the exciter rotor winding 10 to develop any desired amount of excitation current in the main rotor winding 14 at high rotational speeds that lie above the predetermined rotational speed without affecting the low speed characteristics of the WFS dynamoelectric machine 22. By selecting a suitable predetermined rotational speed and value for the impedance 24, back EMF may be limited to insure that the WFS dynamoelectric machine 22 may supply sufficient torque at higher rotational speeds.

The described embodiments of the invention are only some illustrative implementations of the invention wherein changes and substitutions of the various parts and arrangement thereof are within the scope of the invention as set forth in the attached claims.

What is claimed is:

1. A wound field synchronous (WFS) dynamoelectric machine that comprises:
   a rotor assembly;
   an exciter generator section comprising a stationary multiphase exciter stator winding for receiving excitation power from a multiphase alternating current (AC) source to generate an exciter stator magnetic field, a multiphase exciter rotor winding in the rotor assembly for generating multiphase AC excitation power as it cuts through the exciter stator magnetic field and a rotating rectifier assembly in the rotor assembly for converting the multiphase AC excitation power to direct current (DC) excitation power;
   a synchronous machine section comprising a DC main rotor winding in the rotor assembly for generating a main rotor magnetic field and a stationary multiphase main stator winding for receiving a multiphase AC control signal to generate a rotating main stator magnetic field that interacts with the main rotor magnetic field to rotate the rotor assembly; and
   an impedance that selectively connects one phase of the exciter stator winding to another phase of the exciter stator winding that disconnects from the multiphase AC current source above a predetermined rotational speed of the rotor assembly.

2. The WFS dynamoelectric machine of claim 1, wherein the impedance comprises a negative reactance.

3. The WFS dynamoelectric machine of claim 1, wherein the impedance comprises a positive reactance.

4. The WFS dynamoelectric machine of claim 1, further comprising a switching element for selectively connecting the impedance.

5. The WFS dynamoelectric machine of claim 1, wherein the impedance has a value that causes a phase shift between the currents in the phases of the exciter stator winding to which it connects that is sufficient to cause the exciter stator rotor to generate a desired excitation current above the predetermined rotational speed.

6. The WFS dynamoelectric machine of claim 1, wherein the multiphase AC source, the multiphase exciter stator and the multiphase exciter rotor are three phase.

7. The WFS dynamoelectric machine of claim 1, wherein the multiphase AC source has a frequency of approximately 400 Hz.

8. A wound field synchronous (WFS) dynamoelectric machine that comprises:
   a rotor assembly;
   an exciter generator section comprising a stationary three phase exciter stator winding for receiving excitation power from a three phase alternating current (AC) source to generate an exciter stator magnetic field, a multiphase exciter rotor winding in the rotor assembly for generating multiphase AC excitation power as it cuts through the exciter stator magnetic field and a rotating rectifier assembly in the rotor assembly for converting the multiphase AC excitation power to direct current (DC) excitation power;
   a synchronous machine section comprising a DC main rotor winding in the rotor assembly for generating a main rotor magnetic field and a stationary multiphase main stator winding for receiving a multiphase AC control signal to generate a rotating main stator magnetic field that interacts with the main rotor magnetic field to rotate the rotor assembly; and
   a switchable impedance that selectively connects one phase of the exciter stator winding to another phase of the exciter stator winding that disconnects from the three phase AC source above a predetermined rotational speed of the rotor assembly.

9. The WFS dynamoelectric machine of claim 8, wherein the switchable impedance comprises a negative reactance.

10. The WFS dynamoelectric machine of claim 8, wherein the switchable impedance comprises a positive reactance.

11. The WFS dynamoelectric machine of claim 8, wherein the switchable impedance comprises a switching element for selectively connecting a value of impedance.

12. The WFS dynamoelectric machine of claim 8, wherein the value of impedance causes a phase shift between the currents in the phases of the exciter stator winding to which it connects that is sufficient to cause the exciter stator rotor to generate a desired excitation current above the predetermined rotational speed.

13. The WFS dynamoelectric machine of claim 8, wherein the switchable impedance has a value that causes a phase shift between the currents in the phases of the exciter stator winding to which it connects that is sufficient to cause the exciter stator rotor to generate a desired excitation current above the predetermined rotational speed.

14. The WFS dynamoelectric machine of claim 8, wherein the three phase AC source has a frequency of approximately 400 Hz.

15. A wound field synchronous (WFS) dynamoelectric machine that comprises:
   a rotor assembly;
   an exciter generator section comprising a stationary three phase exciter stator winding for receiving excitation power from a three phase alternating current (AC) source to generate an exciter stator magnetic field, a multiphase exciter rotor winding in the rotor assembly for generating multiphase AC excitation power as it cuts through the exciter stator magnetic field and a rotating rectifier assembly in the rotor assembly for converting the multiphase AC excitation power to direct current (DC) excitation power;
   a synchronous machine section comprising a DC main rotor winding in the rotor assembly for generating a main rotor magnetic field and a stationary multiphase main stator winding for receiving a multiphase AC control signal to generate a rotating main stator magnetic field that interacts with the main rotor magnetic field to rotate the rotor assembly; and
   a switchable impedance comprising an impedance and a switching element that selectively connects one phase of the exciter stator winding to another phase of the exciter stator winding that disconnects from the three phase AC source above a predetermined rotational speed of the rotor assembly to induce a phase shift that is sufficient to cause the exciter rotor winding to generate a desired excitation current above the predetermined rotational speed.

16. The WFS dynamoelectric machine of claim 15, wherein the impedance comprises a negative reactance.

17. The WFS dynamoelectric machine of claim 15, wherein the impedance comprises a positive reactance.

18. The WFS dynamoelectric machine of claim 15, wherein the three phase AC source has a frequency of approximately 400 Hz.

* * * * *